Figure 1:
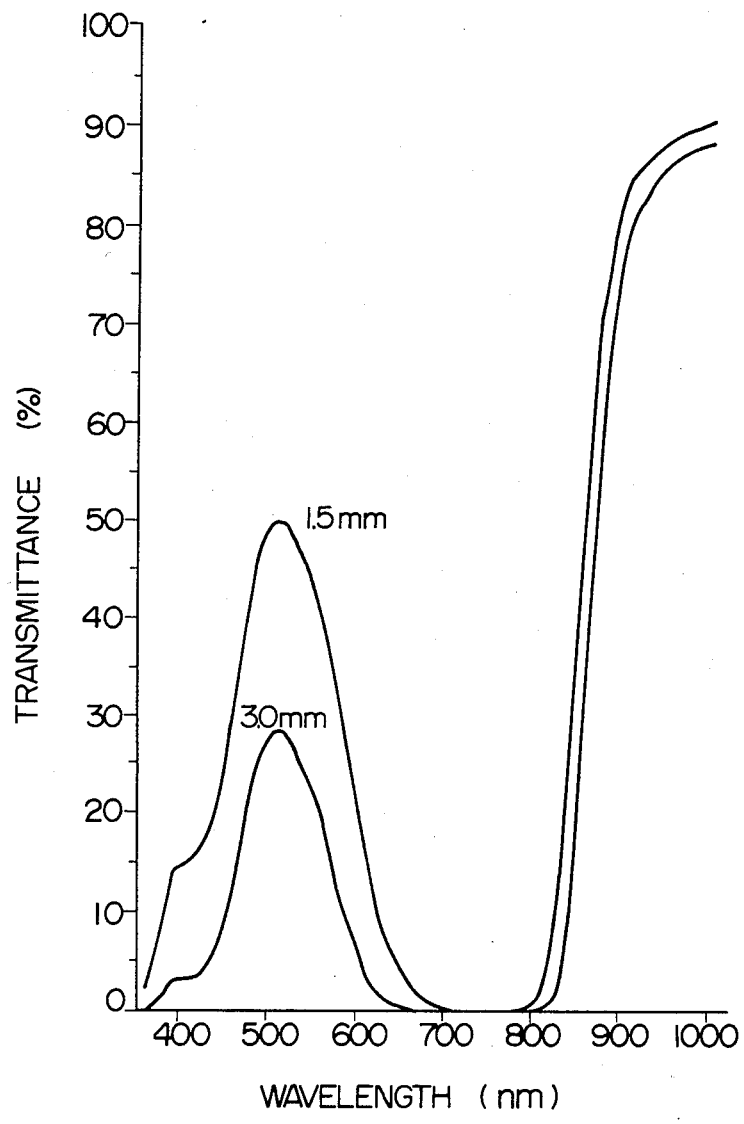

United States Patent [19]

Kojima

[11] Patent Number: 4,755,012
[45] Date of Patent: Jul. 5, 1988

[54] RAY ABSORPTION FILTER

[75] Inventor: Kiyoteru Kojima, Kobe, Japan

[73] Assignee: Sumitomo Chemical Company, Limited, Osaka, Japan

[21] Appl. No.: 868,684

[22] Filed: May 30, 1986

[30] Foreign Application Priority Data

Jun. 5, 1985 [JP] Japan ................ 60-121941

[51] Int. Cl.$^4$ .......................... G02B 5/22; C09K 3/34
[52] U.S. Cl. .................. 350/1.1; 252/299.1; 260/378; 260/380
[58] Field of Search ............ 350/1.1; 260/378, 380; 522/50; 534/590; 526/304; 252/299.1

[56] References Cited

U.S. PATENT DOCUMENTS

| | | | |
|---|---|---|---|
| 3,722,978 | 3/1973 | Sloane et al. | 350/1.1 |
| 4,145,182 | 3/1979 | Opitz et al. | 260/378 |
| 4,432,595 | 2/1984 | Manning | 350/1.1 |
| 4,446,047 | 5/1984 | Thompson | 260/378 |
| 4,455,253 | 6/1984 | Thompson | 260/378 |
| 4,585,574 | 4/1986 | Blunck et al. | 260/380 |

Primary Examiner—John K. Corbin
Assistant Examiner—Martin Lerner
Attorney, Agent, or Firm—Stevens, Davis, Miller & Mosher

[57] ABSTRACT

A near infrared ray absorption filter, particularly usable as a sharp cut filter for an infrared ray sensor, which comprises as an absorbent capable of controlling transmission of a ray at least one anthraquinone compound represented by the following formula,

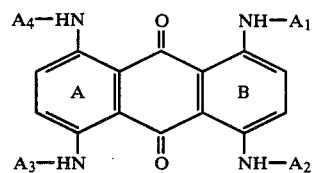

wherein $A_1$, $A_2$, $A_3$ and $A_4$ are different from each other or the same, and stand for a phenyl or naphthyl group unsubstituted or substituted with at least one alkyl, alkoxy, phenoxy or hydroxy group, and the rings A and B are unsubstituted or substituted with at least one lower alkyl group or halogen atom.

6 Claims, 5 Drawing Sheets

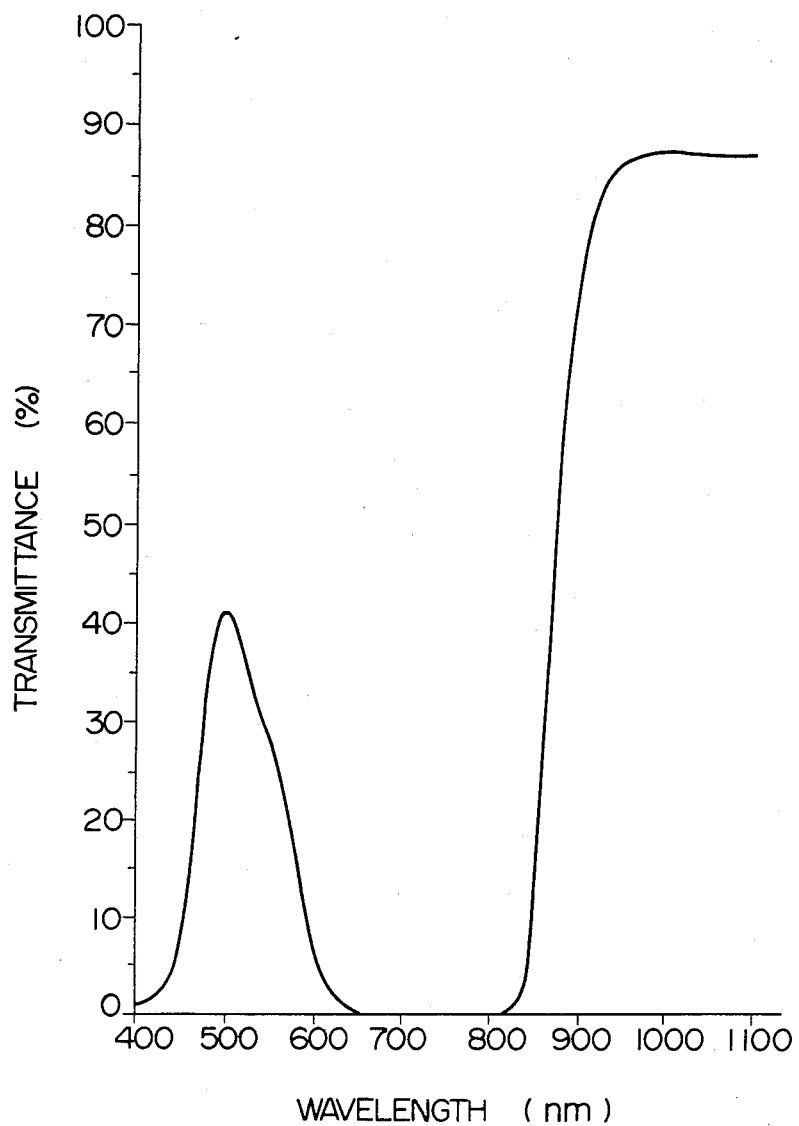
F I G. 5

RAY ABSORPTION FILTER

The present invention relates to a filter capable of controlling transmission of a ray in the region of from visible rays to near infrared rays, and a method for manufacturing the same.

Recently, the control of transmission of a ray in the region of near infrared rays has been put into practice by means of a filter in various forms suited to various industrial fields. For example, the filter has been used in the form of film for intensive cultivation or keeping warmth in an agricultural field, or in the form of a sharp cut filter for an infrared ray sensor in an electronic field, or in the form of sunglasses, goggle or the like, or for the energy-saving in constructions.

The present inventors have undertaken extensive studies to find an absorbent used for such kinds of filter suitable particularly in an electronic field, and as a reuslt found a fact that a specific anthraquinone compound is suited thereto.

Thus, the present invention provides a ray absorption filter comprising as an absorbent capable of controlling transmission of a ray at least one anthraquinone compound represented by the following formula (I),

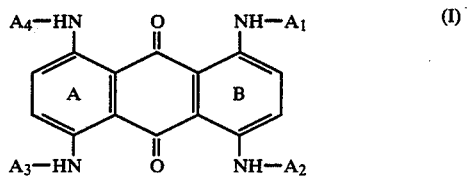

wherein $A_1$, $A_2$, $A_3$ and $A_4$ are independently stand for a phenyl or naphthyl group unsubstituted or substituted with at least one alkyl, alkoxy, phenoxy or hydroxyl group, and the rings A and B are unsubstituted or substituted with at least one lower alkyl group or halogen atom, and also provides a method for manufacturing the same, which comprises using the anthraquinone compound (I).

The anthraquinone compound of the formula (I) can be produced by reacting a 1,4,5,8-tetrachloroanthraquinone, 1,5-dichloro-4,8-dinitroanthraquinone or their derivatives substituted with a lower alkyl group or a halogen atom on the anthraquinone ring with an aniline compound or a naphthylamine compound under heating in the presence or absence of an inert solvent. For example, the reaction between 1,4,5,8-tetrachloroanthraquinone and aniline can be effected to produce 1,4,5,8-tetra(phenylamino)anthraquinone. Likewise, the other amine compounds including the aniline and naphthylamine compounds can give the corresponding respective anthraquinone compounds of the formula (I).

The aniline compound usable includes unsubstituted or alkyl-substituted aniline compounds such as aniline, p-toluidine, m-toluidine, o-toluidine, p-ethylaniline, p-n-butylaniline, p-t-butylaniline, p-n-octylaniline, 2,4-dimethylaniline, 3,4-dimethylaniline, 2,5-dimethylaniline, 2,6-dimethylaniline, 3,5-dimethylaniline, 2,4,6-trimethylaniline, 3-trifluoromethylaniline and the like, alkoxyaniline compounds such as p-anisidine, m-anisidine, o-anisidine, p-phenetidine, m-phenetidine, o-phenetidine, p-n-propyloxyaniline, p-n-butyloxyaniline, p-(2-hydroxyethyl)aniline, 2,5-dimethoxyaniline, 2,4-dimethoxyaniline, 2,4-diethoxyaniline and the like, phenoxyaniline compounds such as p-phenoxyaniline, p-(4'-chlorophenyloxy)aniline, and others such as 2-methoxy-4-methylaniline. The naphthylamine compound usable includes α-naphthylamine, β-naphthylamine, 2-methyl-1-aminonaphthalene and the like.

Of these amine compounds, preferred are aniline compounds such as alkylaniline and alkoxyaniline compounds. Particularly preferred are p-toluidine and p-phenetidine.

These amine compounds are used usually each alone, or may be used in a mixture thereof to obtain a mixture of the anthraquinone compounds represented by the formula (I), wherein $A_1$, $A_2$, $A_3$ and $A_4$ are partially or wholly different from each other.

The reacton between the starting anthraquinone compound and the amine compound can be carried out in the presence of an inert solvent such as sulfolane, dimethyl sulfoxide, carbitol or cellosolves, or in the absence of such solvent, but using the amine compound in an excess amount for the solvent. The reaction temperature ranges from 100° C. to 200° C., preferably from 150° C. to 200° C., and the reaction can be completed within several hours to 20 hours.

The thus obtained anthraquinone compound of the formula (I) can exhibit an absorption maximum at a wavelength of between 750 and 800 nm and near 400 nm, and strongly adsorb a ray in the region of from visible rays to near infrared rays of up to 800 or 900 nm. Accordingly, when used alone or along with other colorants or ultraviolet ray absorbents, the anthraquinone compound of the formula (I) has been found to be suitable for controlling transmission of a ray in the region of from near ultraviolet rays to near infrared rays, and particularly suitable for the production of a sharp cut filter for an infrared ray sensor showing a transmission limit of a short wavelength side in the wavelength region of from 800 to 900 nm.

In the production of a ray absorption filter, the anthraquinone compound of the formula (I) may be used alone or in a mixture of two or more depending on the utilities, or may be used along with conventional colorants and/or ultraviolet ray absorbents.

The ray absorption filter can be produced by a conventional method including the following preferred methods.

(1) The anthraquinone compound of the formula (I) is blended with a thermoplastic resin such as polystyrene, polyacrylate, polyester, polycarbonate and the like, and then the mixture is subjected to molding, preferably injection molding, thereby obtaining plate-like moldings.

(2) A blend of the anthraquinone compound of the formula (I) and a thermosetting resin such as epoxy resin, phenol-formaline resin and the like is introduced into a mold, or coated, and then cured.

(3) The anthraquinone compound of the formula (I) is formed into an ink or a lacquer in a conventional manner, and then the ink or lacquer is printed or coated on a transparent substrate.

Moreover, the ray absorption filter can be produced by a vapor deposition method or a dyeing method.

Depending on the structure, size, material or utilization purpose of the filter to be produced, a method can be suitably selected from those described above. The amount of the anthraquinone compound (I) to be used varies also depending thereon. However it is usually from 0.01 to 5% by weight based on the weight of the thermoplastic resin, thermosetting resin or the other compound.

The filter in accordance with the present invention is useful in various industrial fields, particularly as a sharp cut filter for an infrared ray sensor in an electronic field.

The present invention is illustrated in more detail with reference to the following Examples and Reference Examples, which are not intended to limit the scope of the present invention. In Examples, parts are by weight.

REFERENCE EXAMPLE 1

Synthesis of the anthraquinone compound (I)

A mixture of 1,4,5,8-tetrachloroanthraquinone (34.6 parts) and p-toluidine (214 parts) was allowed to react at 190° C. for 15 hours. Thereafter, the reaction mixture was cooled, and the precipitate was collected on a suction filter, washed four times with methanol (500 parts) and then twice with hot water (500 parts), and dried to obtain 1,4,5,8-tetra(4'-methylphenylamino)anthraquinone (48.7 parts) as a black solid. The product was recrystallized from toluene to obtain a dark green crystal. The melting point and maximum absorption wave lenggh ($\lambda_{max}$ measured in acetone) were found to be 268° to 275° C. and 760 nm, respectively.

REFERENCE EXAMPLE 2

Synthesis of the anthraquinone compound (I)

A mixture of 1,4,5,8-tetrachloroanthraquinone (34.6 parts) and p-phenethidine (274 parts) was allowed to react at 190° C. for 20 hours. Thereafter, the reaction mixture was cooled, and the precipitate was collected on a suction filter, washed four times with methanol (500 parts) and then twice with hot water (500 parts), and dried to obtain 1,4,5,8-tetra(4'-ethoxyphenylamino)anthraquinone as a black solid. Recrystallization thereof from toluene gave a green crystal having a melting point of 173° to 175° C. and $\lambda_{max}$ (acetone) of 760 nm.

REFERENCE EXAMPLE 3

Reference Example 2 can be repeated, provided that the amine compound as shown in Table 1 is used, whereby the corresponding 1,4,5,8-tetraaminoanthraquinone compound can be obtained.

TABLE 1

| Amine compound | Anthraquinone compound of the formula (I) |
|---|---|
| Aniline | 1,4,5,8-Tetra(phenylamino)-anthraquinone |
| α-Naphthylamine | 1,4,5,8-Tetra(α-naphthylamino)-anthraquinone |
| p-Anisidine | 1,4,5,8-Tetra(4'-methoxyphenyl-amino)anthraquinone |
| 2,4-Dimethylaniline | 1,4,5,8-Tetra(2',4'-dimethylphenyl-amino)anthraquinone |
| 2,5-Dimethoxyaniline | 1,4,5,8-Tetra(2',5'-dimethoxy-phenylamino)anthraquinone |
| p-Aminophenol | 1,4,5,8-Tetra(4'-hydroxyphenyl-amino)anthraquinone |
| p-n-Butylaniline | 1,4,5,8-Tetra(4'-n-butylphenyl-amino)anthraquinone |
| p-tert-Butylaniline | 1,4,5,8-Tetra(4'-tert-butylphenyl-amino)anthraquinone |
| m-Anisidine | 1,4,5,8-Tetra-(3'-methoxyphenyl-amino)anthraquinone |
| 4-Aminodiphenylether | 1,4,5,8-Tetra(4'-phenoxyphenyl-amino)anthraquinone |
| 3-Trifluoromethyl-aniline | 1,4,5,8-Tetra(3'-trifluoromethyl-phenylamino)anthraquinone |

TABLE 1-continued

| Amine compound | Anthraquinone compound of the formula (I) |
|---|---|
| Aniline p-Toluidine (1:1) | (a mixture of those having —C₆H₅ or —C₆H₄—CH₃ as X₁, X₂, X₃ and X₄) structure shown |

REFERENCE EXAMPLE 4

Likewise, the 1,4,5,8-tetraminoanthraquinone as shown in Table 2 can be obtained using the starting anthraquinone compound and amine compound as shown in Table 2.

TABLE 2

| Starting anthraquinone compound | Amine compound | Anthraquinone compound of the formula (I) |
|---|---|---|
| 1,4,5,8-Tetrachloro-2-methyl-anthraquinone | p-Phenetidine | 1,4,5,8-Tetra(4'-ethoxyphenylamino)-2-methylanthraquinone |
| 1,2,4,5,8-Pentachloro-anthraquinone | p-Toluidine | 1,4,5,8-Tetra(4'-methylphenylamino)-2-chloro anthraquinone |
| 1,2,4,5,8-Penta-bromoanthraquinone | m-Propoxy-aniline | 1,4,5,8-Tetra(3'-propyloxyphenylamino-2-bromoanthraquinone |

EXAMPLE 1

1,4,5,8-Tetra(4'-ethoxyphenylamino)anthraquinone (0.05 part) obtained in Reference Example 2 was blended with a polystyrene resin (100 parts) [Esblite 4-62 (a product of Sumitomo Chemical Co.)], and the mixture was subjected to injection molding in a conventional manner, obtaining two plate-like moldings of a green color having a thickness of 1.5 mm and 3.0 mm, respectively. Each spectrotransmittance curve thereof is as shown in FIG. 1.

EXAMPLE 2

Figure 2:
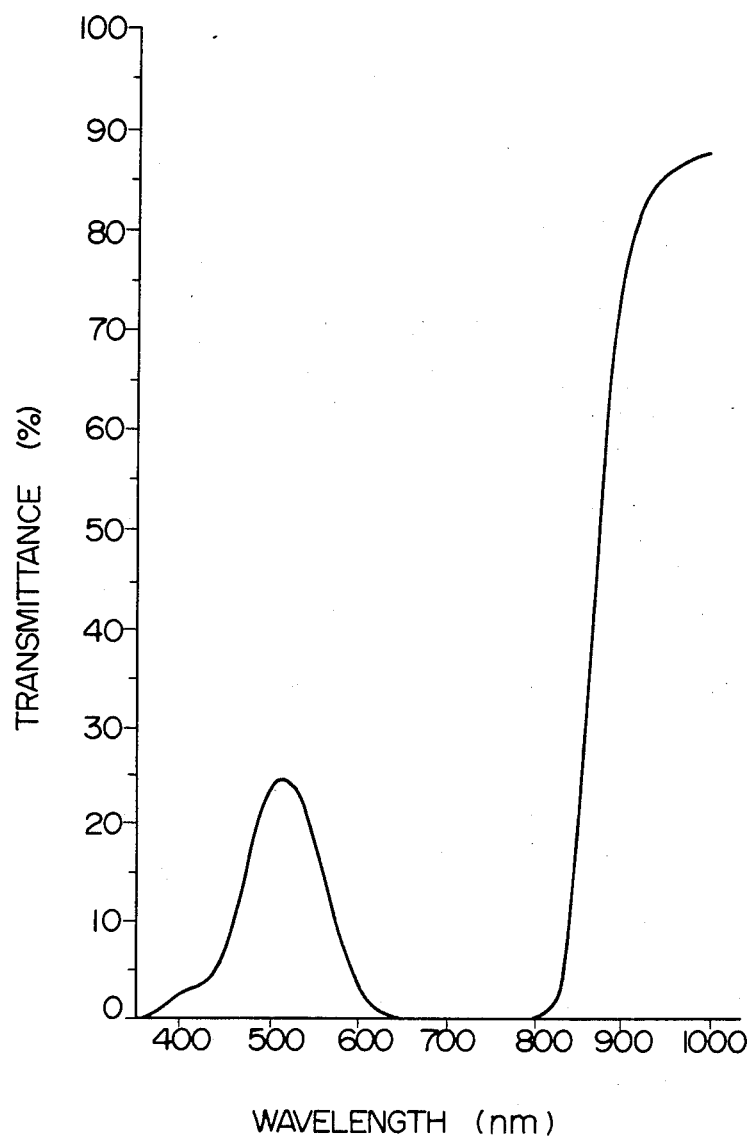

A mixture (0.1 part) of anthraquinone compound represented by the following formula,

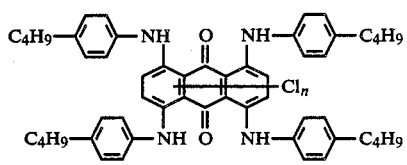

wherein n is a number of 1 to 4 and 1.8 on the average, obtained in a manner similar to that of Reference Example 4, was blended with a polystyrene resin (100 parts) [Esblite 4-62 (a product of Sumitomo Chemical Co.)], and the mixture was subjected to injection molding in a conventional manner, obtaining a green plate-like molding of 1.5 mm in thickness. The transmittance curve thereof is as shown in FIG. 2.

EXAMPLE 3

Figure 3:
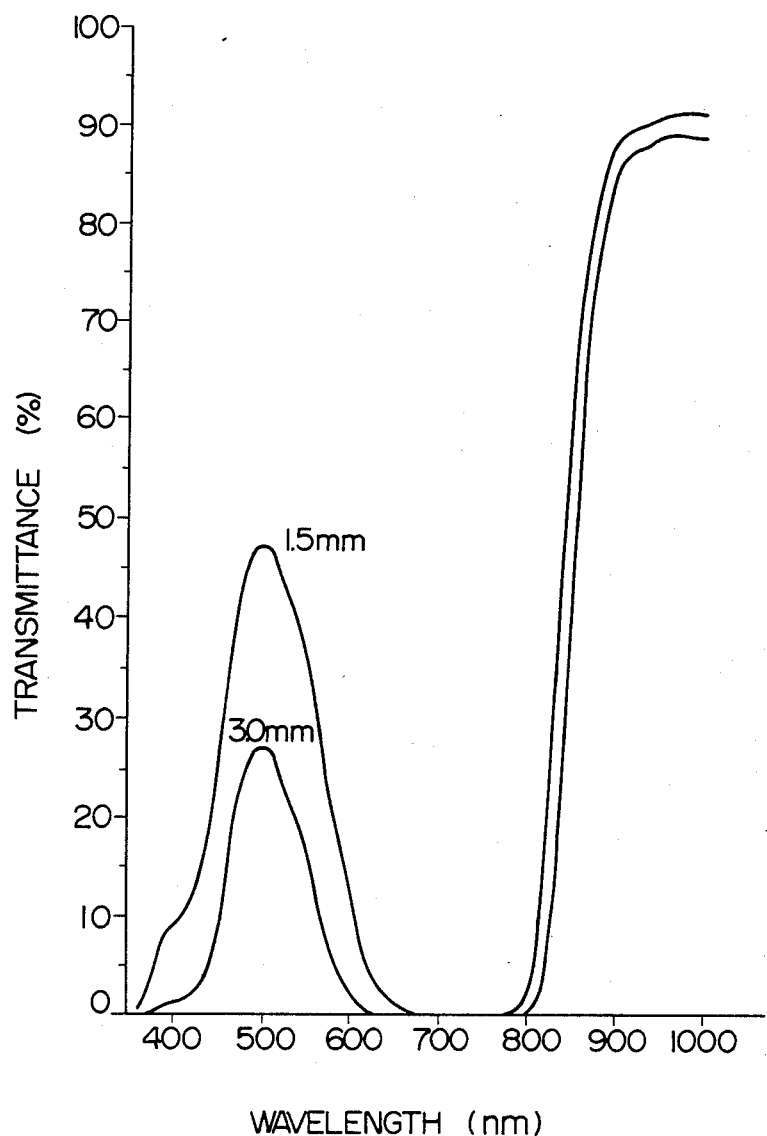

1,4,5,8-Tetra(4'-methylphenylamino)anthraquinone (0.05 part) obtained in a manner similar to that of Reference Example 1 was blended with a polymethylmethacrylate (100 parts) [Sumipex B-LG (a product of Sumitomo Chemical Co.)], and the mixture was subjected to injection molding in a conventional manner obtaining two plate-like moldings of a green color having each thickness of 1.5 mm and 3.0 mm, respectively. Each transmittance curve thereof is as shown in FIG. 3.

EXAMPLE 4

Figure 4:
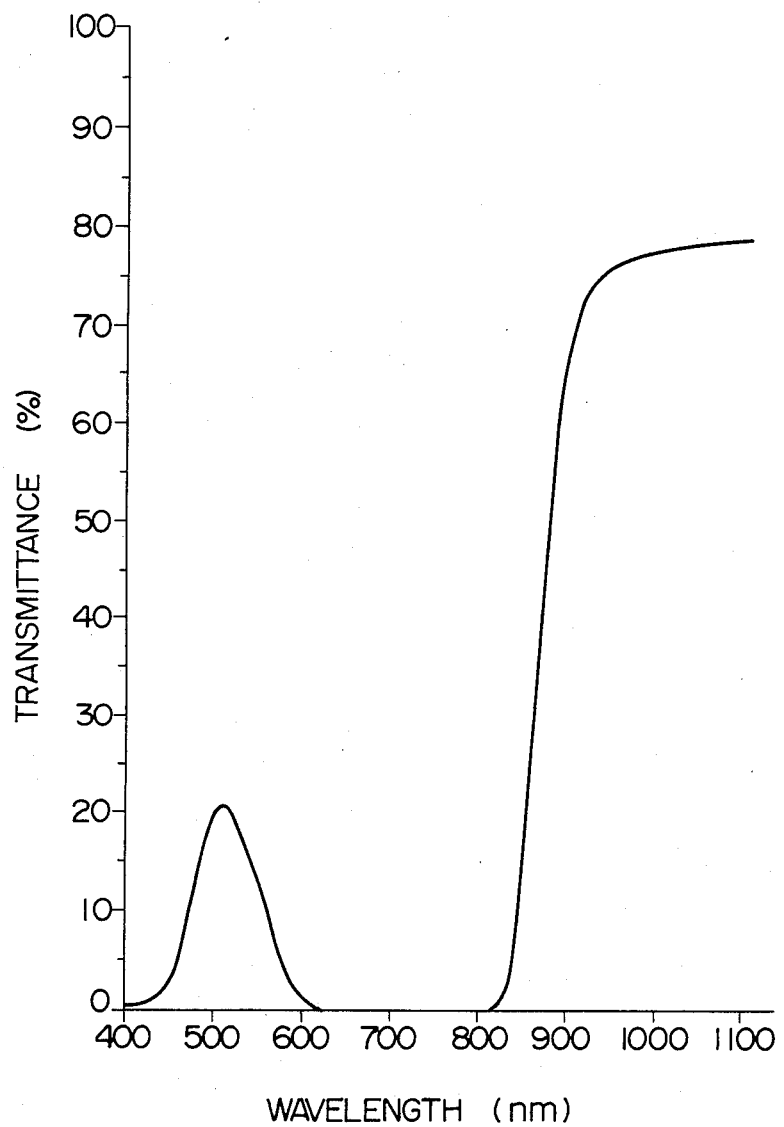

1,4,5,8-Tetra(4'-ethoxyphenylamino)anthraquinone (0.2 part) obtained in Reference Example 2 was blended thoroughly with a mixture of a bisphenol type epoxy resin (54 parts) (Sumiepoxy ELA-128, a product of Sumitomo Chemical Co.), methylcyclohexanedicarboxylic acid anhydride (45 parts) (NH-5500, a product of Hitachi Kasei Co.) and phenol salt of 1,8-diazabicyclo[5,4,0]-7-undecene (1 part), and then the mixture was introduced between two Teflon plates, and then cured at 130° C. for 3 hours to obtain a plate of 1 mm in thickness. The transmittance curve thereof is as shown in FIG. 4.

EXAMPLE 5

1,4,5,8-Tetra(4'-n-butylphenylamino)anthraquinone (5 parts) obtained in Reference Example 3 was dissolved in trichloroethylene (85 parts). Thereafter, ethylcellulose (10 parts) (Ethocel 7 cp, a product of Dow Chemical Co.) was dissolved uniformly therein to obtain a coating liquid. The liquid was coated on a glass plate using Bar coater #32 (a product R. D. S. Webster Co.), and then dried. The transmittance curve is as shown in FIG. 5.

FIGS. 1 to 5, wherein respective transmittance curves of the filters obtained in Examples 1 to 5 are shown, and "mm" means a thickness of the filter, demonstrate that the anthraquinone compounds in according with the present invention are particularly suitable for the production of a short wavelength cutting fiber showing a transmission limit in the wavelength region of from 800 to 900 nm.

From FIGS. 1 to 5, it can be observed that there is a wavelength region near 550 nm, within which some rays are transmitted. If this is disadvantageous to some utilities, known colorants capable of absorbing the rays of such wavelength, for example red colorants having an absorption maximum near 500 nm, may be used at the same time.

What is claimed is:

1. A ray absorption filter comprising as an absorbent capable of controlling transmission of a ray at least one anthraquinone compound represented by the following formula,

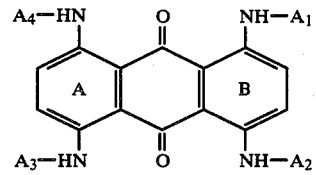

wherein $A_1$, $A_2$, $A_3$ and $A_4$ are independently stand for a phenyl or naphthyl group unsubstituted or substituted with at least one alkyl, alkoxy, phenoxy or hydroxyl group, and the rings A and B are unsubstituted or substituted with at least one lower alkyl group or halogen atom.

2. A ray absorption filter according to claim 1, wherein the anthraquinone compound is the one having phenyl groups substituted with at least one alkyl or alkoxy group as $A_1$, $A_2$, $A_3$ and $A_4$.

3. A ray absorption filter according to claim 1, wherein the anthraquinone compound is at least one member selected from 1,4,5,8-tetra(4'-methylphenylamino)anthraquinone, 1,4,5,8-tetra(4'-ethoxyphenylamino)anthraquinone, and 1,4,5,8-Tetra(4'-n-butylphenylamino)anthraquinone.

4. A ray absorption filter according to claim 1, wherein the anthraquinone compound is 1,4,5,8-tetra(4'-methylphenylamino)anthraquinone.

5. A ray absorption filter according to claim 1, wherein the anthraquinone compound is 1,4,5,8-tetra(4'-ethoxyphenylamino)anthraquinone.

6. A near infrared ray absorption filter according to claim 1, wherein the filter is a sharp cut filter for an infrared ray sensor showing a transmission limit of a short wavelength side in the wavelength region of from 800 to 900 nm.

* * * * *